Oct. 18, 1927.

O. WIDMAIER 1,645,842

ENVELOPE FOLDING AND SEALING DEVICE

Filed Nov. 21, 1925    8 Sheets-Sheet 1

Inventor:
Otto Widmaier
by            
Atty.

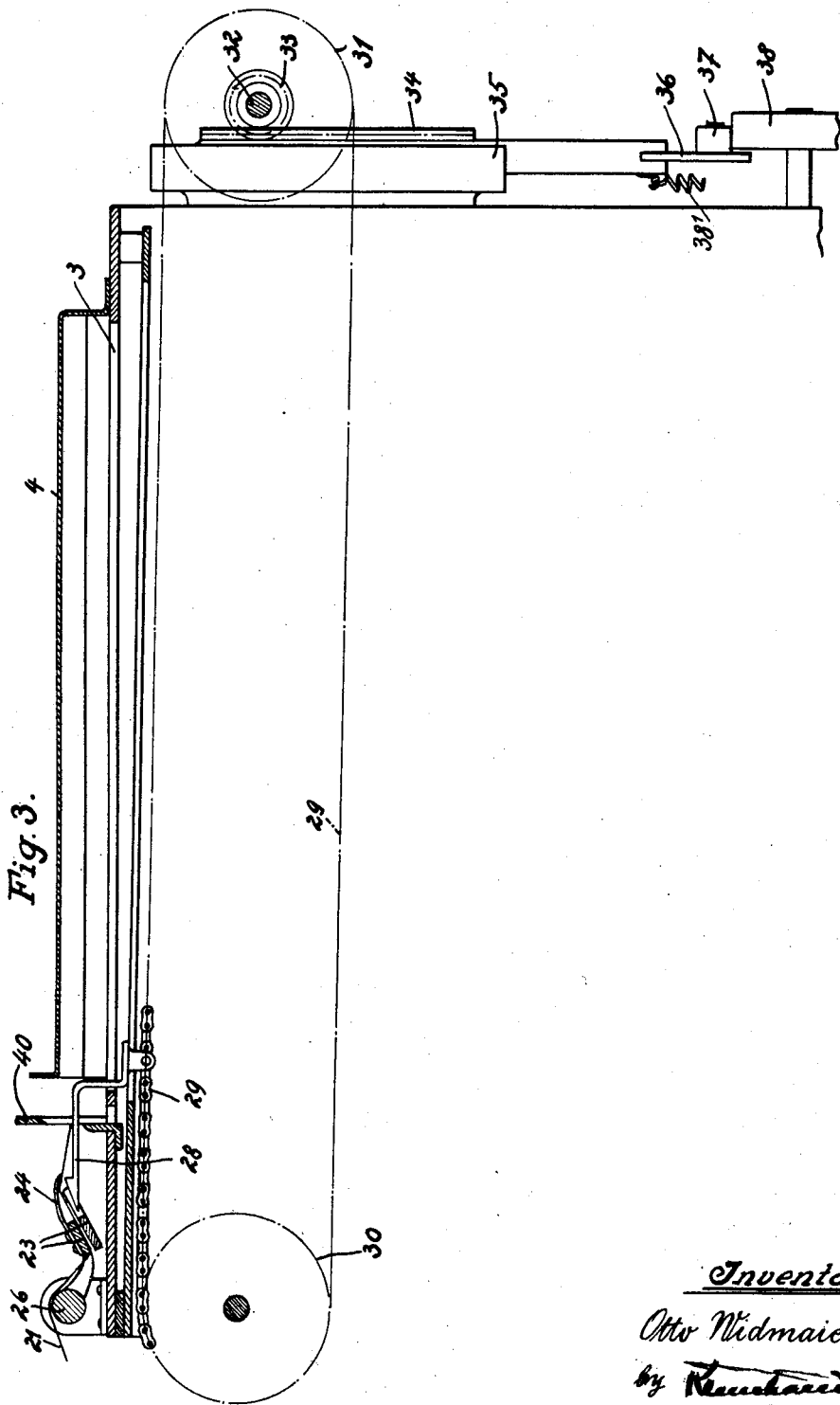

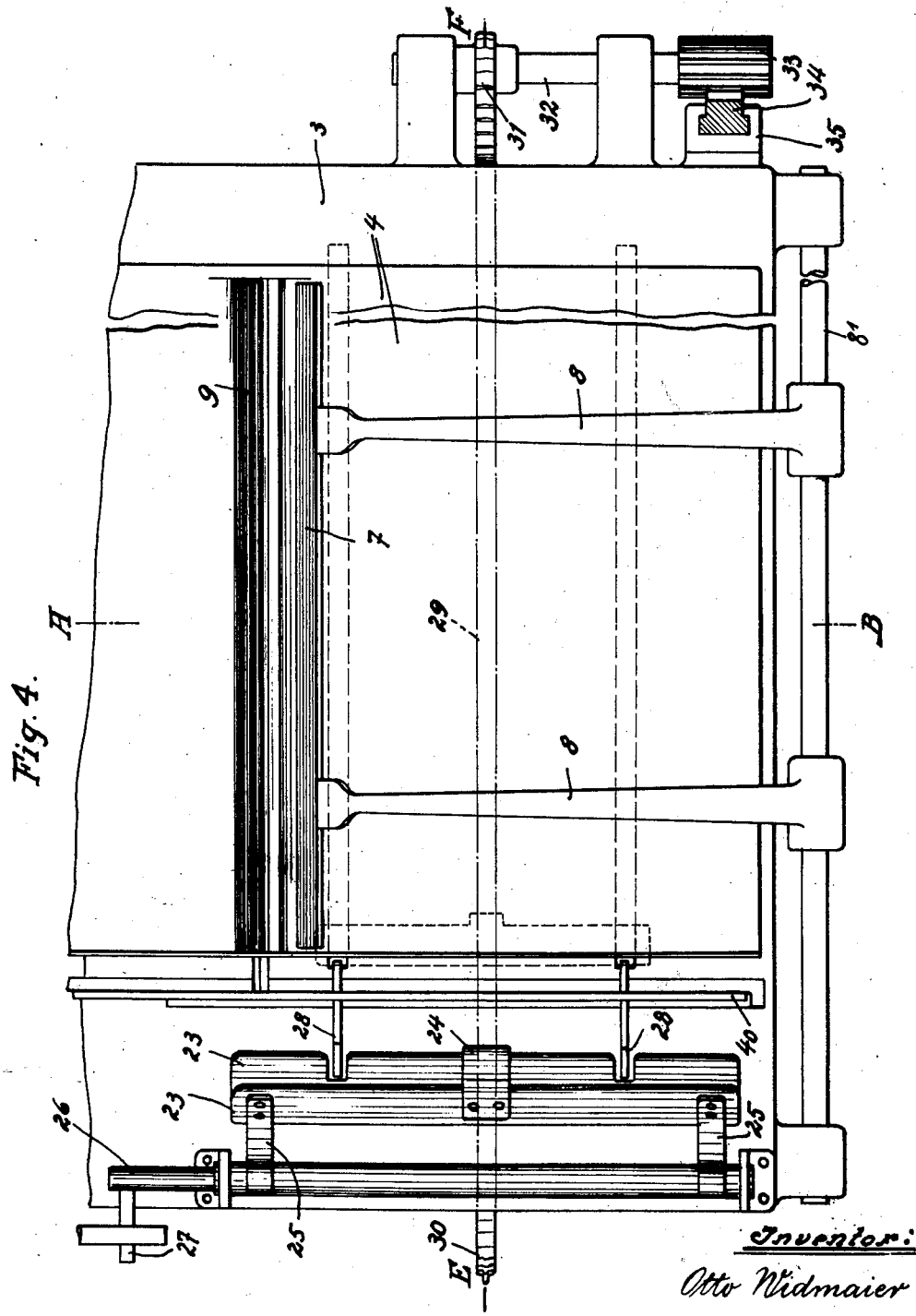

Oct. 18, 1927.
O. WIDMAIER
1,645,842
ENVELOPE FOLDING AND SEALING DEVICE
Filed Nov. 21, 1925     8 Sheets-Sheet 4
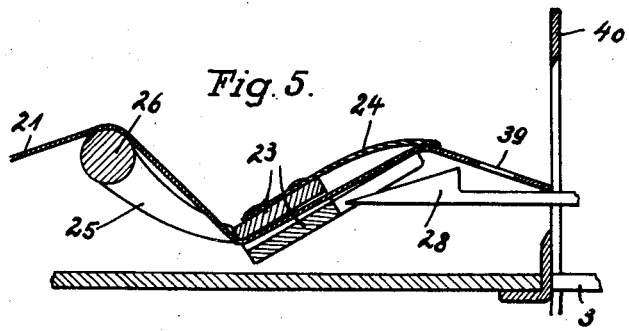
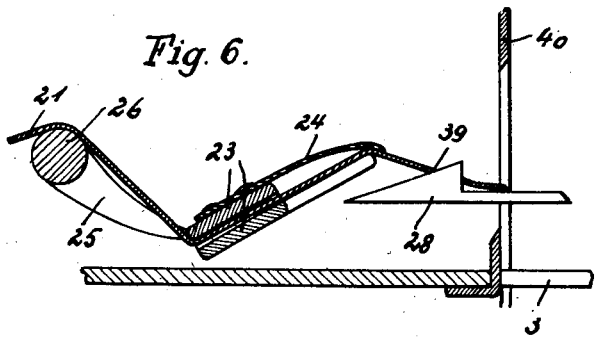
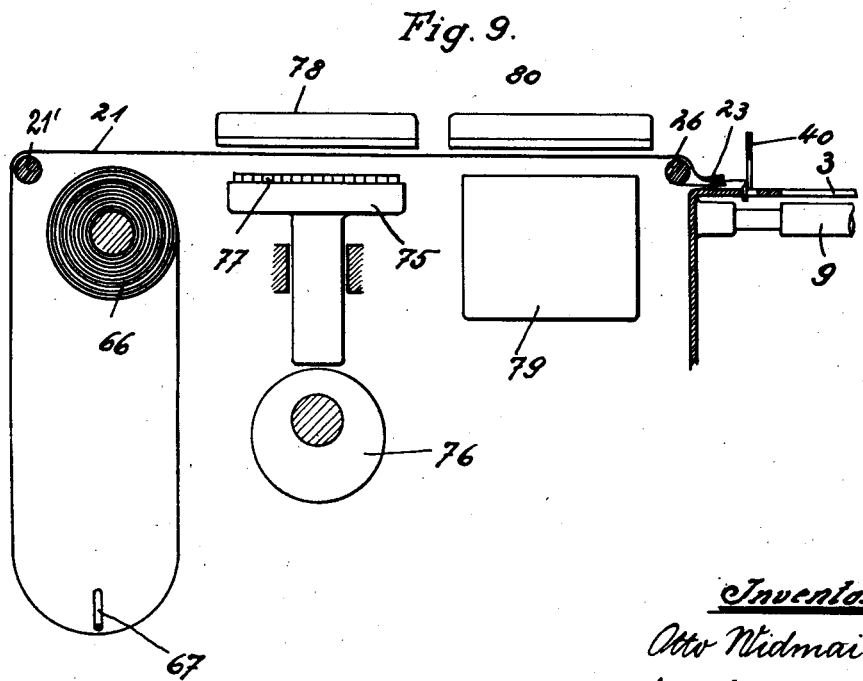

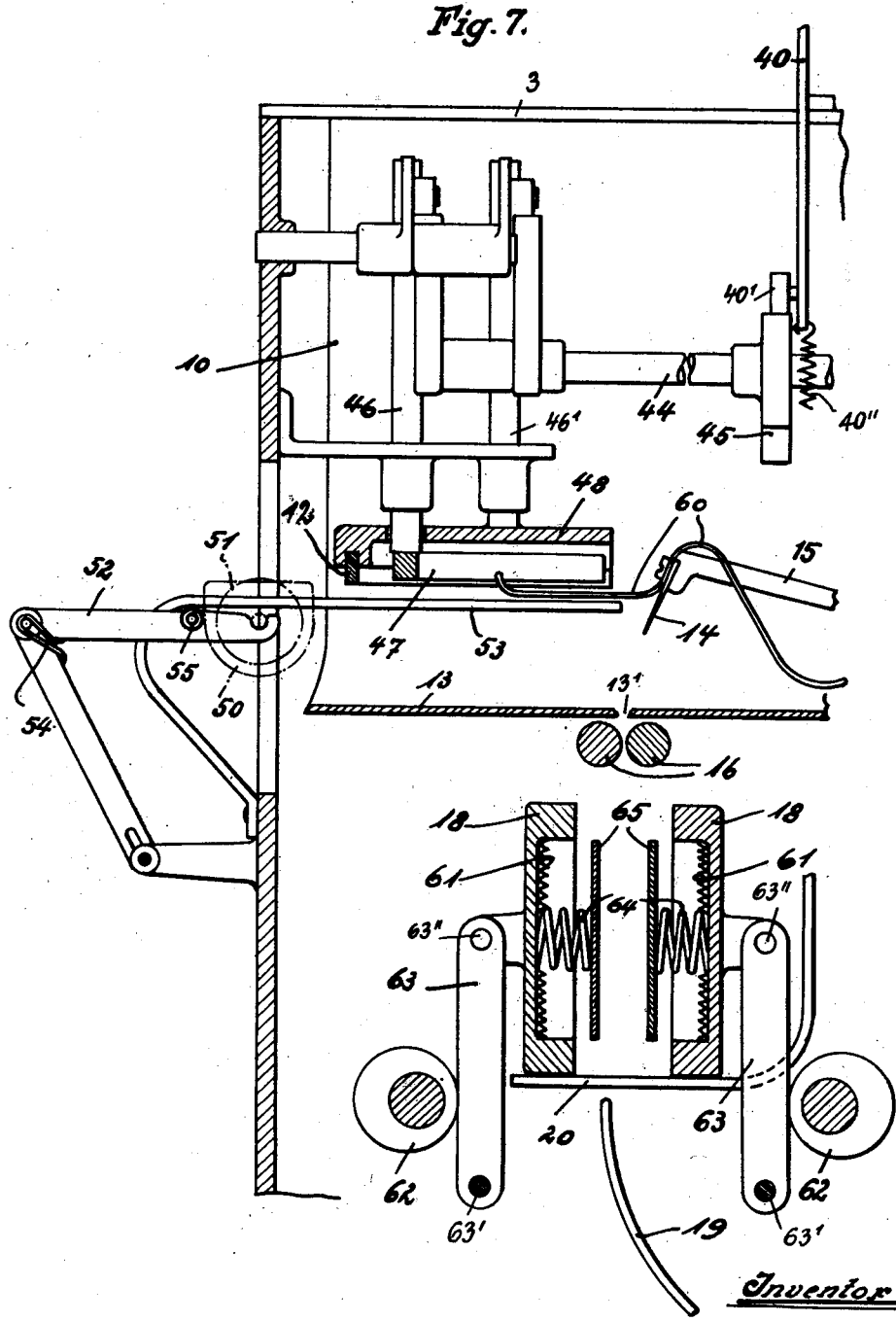

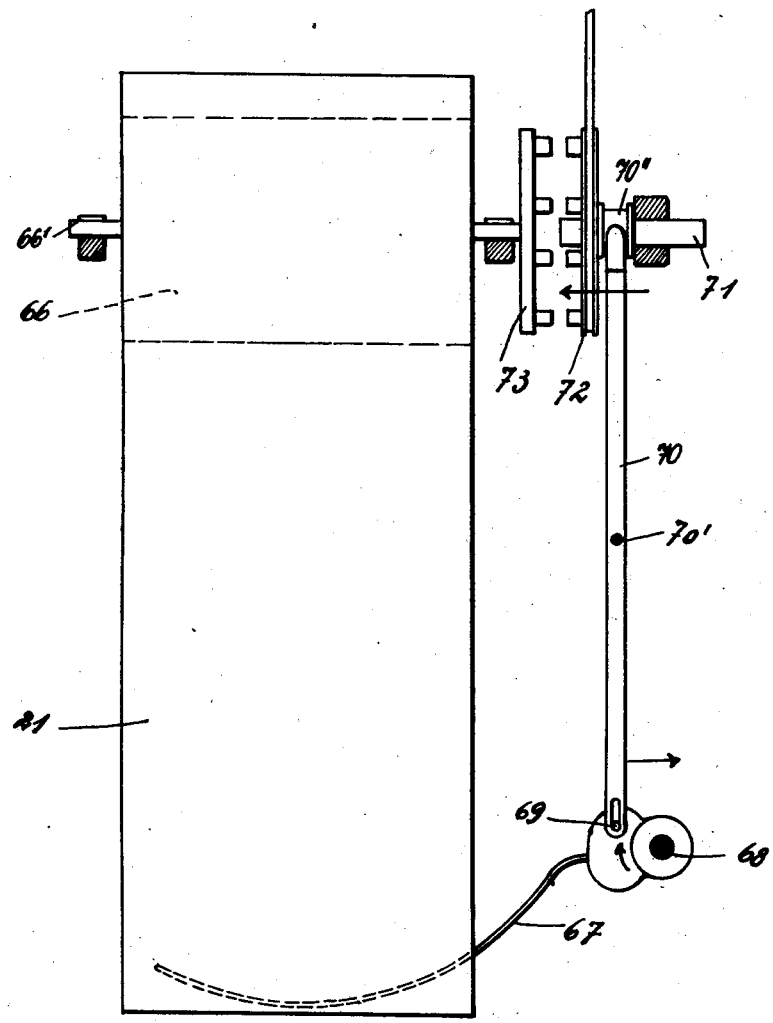

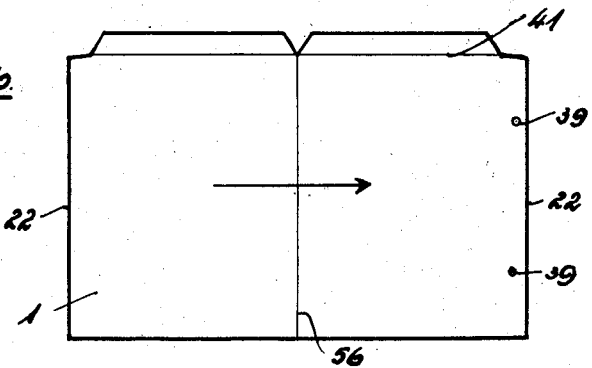
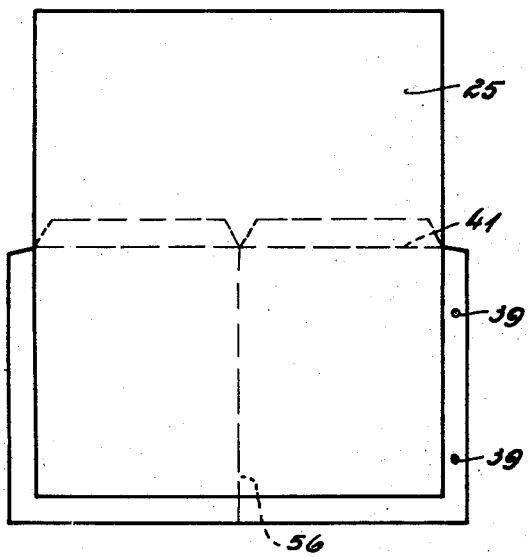
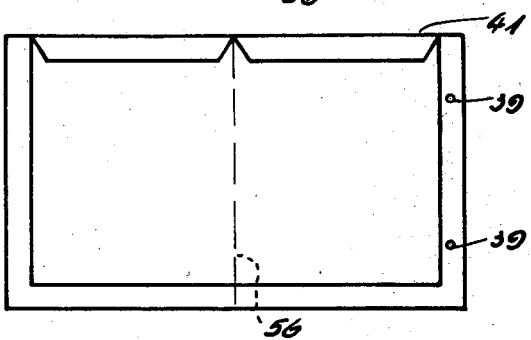

Oct. 18, 1927.
O. WIDMAIER
ENVELOPE FOLDING AND SEALING DEVICE
Filed Nov. 21, 1925     8 Sheets-Sheet 8
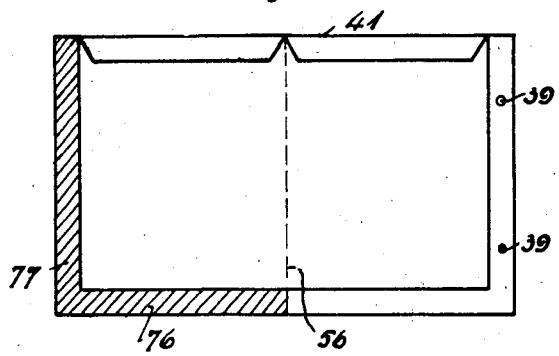
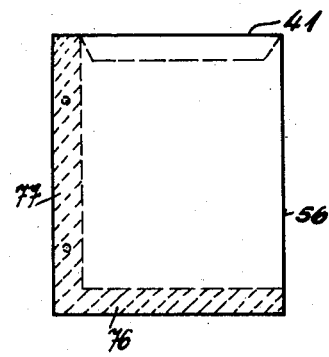
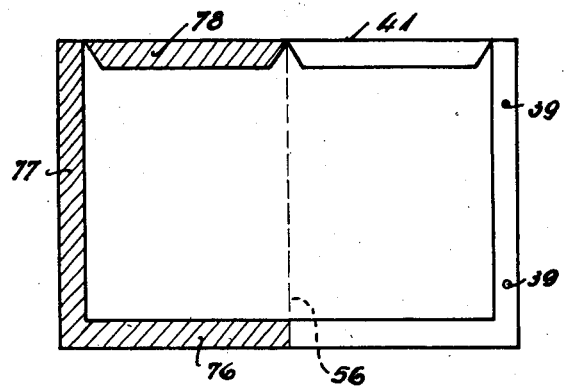
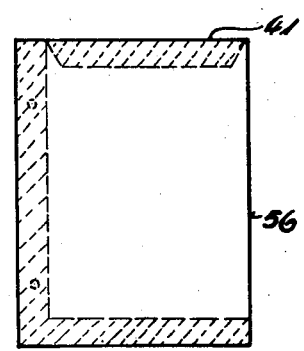
Inventor:
Otto Widmaier
by Kin—— Atty.

Patented Oct. 18, 1927.

1,645,842

UNITED STATES PATENT OFFICE.

OTTO WIDMAIER, OF STUTTGART, GERMANY.

ENVELOPE FOLDING AND SEALING DEVICE.

Application filed November 21, 1925, Serial No. 70,560, and in Germany January 27, 1925.

My invention relates to devices for folding and sealing envelopes and more particularly to devices of the type in which a letter is placed on the envelope and folded with it, the envelope being then sealed. Devices of this kind as hitherto designed involve the drawback that each letter and envelope must be fed separately and in consequence thereof these devices are comparatively slow and their output is correspondingly small.

This drawback is overcome in the improved device according to this invention, in which the envelopes and, if desired, also the letters or other enclosures are fed automatically, whereby not only the output but also the accuracy of operation are increased. In order to effect a reliable feeding of the envelopes, the envelopes are cut from a continuous web whereby the cost of manufacturing the envelopes is reduced also.

The invention also relates to other improvements of devices of this type, for instance to improved folding, sealing and pressure applying means, which are combined to obtain maximum output combined with maximum accuracy.

In the drawings affixed to this specification and forming part thereof a device embodying my invention is illustrated diagrammatically by way of example.

In the drawings,

Fig. 3 is a section on the line E—F in Fig. 4,

Fig. 4 is a plan view,

Figure 1:
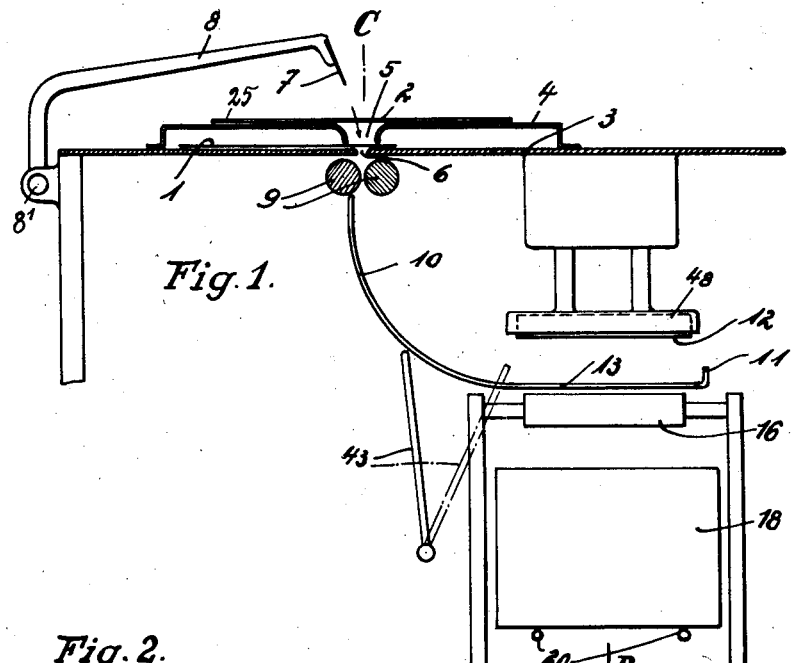
Fig. 1 is an elevation, partly in section on the line A—B in Fig. 4.
Figure 2:
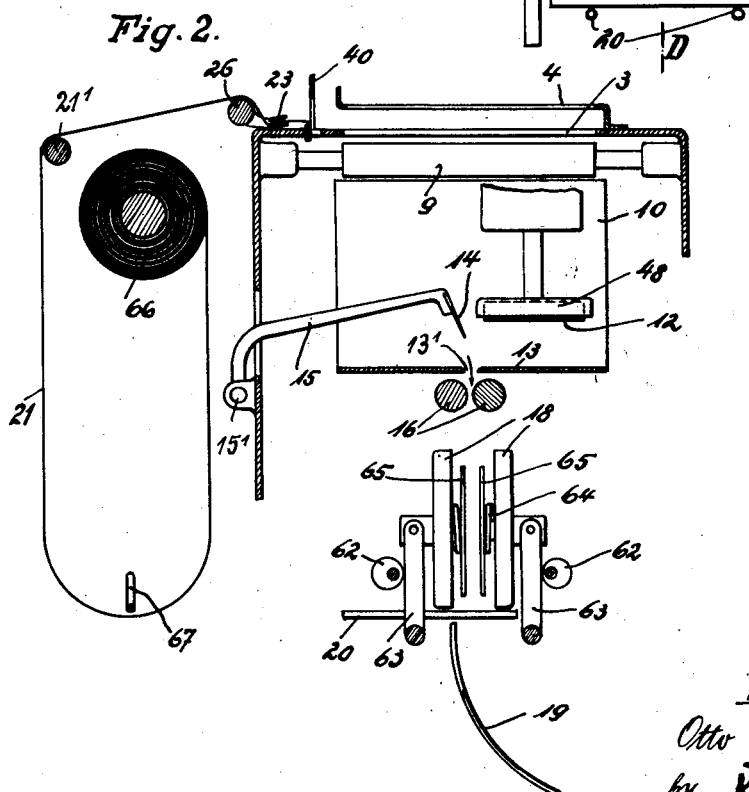
Fig. 2 is a section on the line C—D in Fig. 1, viewed from the left.

Figs. 5 and 6 are sections showing the envelope feeding device on a larger scale in the positions before and after engaging an envelope, respectively, Fig. 7 is a section similar to Fig. 2 but drawn to a larger scale and viewed from the right in Fig. 1, Fig. 8 is an elevation showing means for periodically stretching the web from which the envelope blanks are severed, Fig. 9 is a diagram of a device comprising also means for printing and addressing the envelopes, Fig. 10 illustrates an envelope blank, while Figs. 11 to 14 illustrate the successive stages of folding, applying adhesive to and sealing an envelope open on one side, while Figs. 15 and 16 illustrate the finishing stages of an envelope which is closed on all sides.

Referring first to Figs. 10 to 16, 1 is an envelope blank separated from a continuous web of paper along the lines 22, 22. 39, 39 are perforations near one edge of the blank which are designed to be engaged by automatic feeding members. The letter or other enclosure 25 is placed by hand or by automatic feeding means on the envelope as shown in Fig. 11 and a pair of flaps is folded over together with the letter 25 along the line 41, as shown in Fig. 12. If the enclosure is printed matter, or if, for some other reason, the envelope shall remain open along one edge, adhesive is applied only along two edges extending at right angles to each other on one side of the envelope, as indicated by the hatched portions 76 and 77 in Fig. 13. When adhesive has been applied, the envelope is folded along its transverse central line 56 so that the adhesive-coated portions 76 and 77 are applied onto the corresponding uncoated portions along the two opposite edges of the envelope. The finished envelope is shown in Fig. 14. Adhesive has not been applied to the flaps which have been bent over along the line 41 and the envelope is thus left open at the edge 41 but its enclosure is retained by the flaps extending along that edge. When the envelope shall be closed altogether, adhesive is applied not only to the portions 76 and 77, but also to one of the flaps, preferably the flap adjoining these portions, as indicated by hatching at 78. Otherwise the envelope is treated as described with reference to Figs. 13 and 14, being folded along the line 56 and then delivered to the sealing press.

Referring now to Figs. 1 and 2, 3 is the main operating table, past which a web 21 is fed by automatic means (not shown) from a supply 66. Blanks 1 are successively severed from the web by a vertically movable cutter 40. The table 3 carries a superstructure 4 on which the letter or other enclosure 25 is placed as shown in Fig. 1. The tables 3 and 4 are slotted at 5 and 6, respectively, and a folder 7 is arranged to enter the slots and to fold the envelope and its enclosure along the line 41 as described with reference to Figs. 11 and 12. The folder 7 is secured to a pair of arms 8 mounted on a shaft 8' to which rocking motion is imparted at predetermined intervals by automatic means of any suitable kind (not shown).

A pair of permanently rotating cylinders 9 disposed below the slot 6 engages the envelope blank 1 and its enclosure 25, when they have been forced through the slot 6, and feed them onto a chute 10 leading to a table 13 extending below and in parallel to table 3. Fingers 43 advanced by suitable automatic means (not shown) push the blank against the upturned edge 11 of table 13. The blanks are now engaged by an automatic presser foot and adhesive applying device 12 mounted in a reciprocating frame 48, which is lowered at predetermined intervals onto the table 13 by automatic means (not shown) and presses the blanks onto the table while applying adhesive to the portions 76, 77 and 78, as the case may be. First the adhesive applying device and immediately thereafter also the presser foot are now withdrawn and a second folder 14 extending at right angles to the first one, is lowered through a slot 13' in the table 13 and folds the blank along the line 56 and forces it into engagement with a second pair of feed cylinders 16 which deliver the envelope to a sealing press 18. The folder 14 is secured to arms 15 mounted on a shaft 15' which is periodically rocked as described with reference to the shaft 8' of the folder 7.

The sealing press is provided with two plates 18 and heated sealing plates 65 which are periodically advanced and retracted by automatic means. During the sealing operation the envelopes are supported on two bars 20 which can be withdrawn by automatic means, when the sealing operation is finished so that the letters slide down a chute 19 to the point of delivery.

The paper web 21 is fed from a reel 66. When the device is set operating, the web is inserted between a pair of laths 23 carried on arms 25 secured to a shaft 26 past which the web is moving. Feeding motion is imparted to the web by a horizontally reciprocating chain 29 which is carried on sprockets 30 and 31 at the front and rear ends of the device, as shown in Figs. 3 and 4. A pinion 33 is secured on the shaft 32 of the rear sprocket 31 and meshes with a rack 34 vertically movable in a guide 35 and to which reciprocating motion is imparted by a cam 38, a roller 37 and an extension 36. Cam 38 is secured on a shaft rotated by means not shown, a spring 38' tends to hold the roller 37 engaged with the cam 38. By these means chain 29 is alternately moved forwards and backwards.

Grippers 28 are mounted on the chain 29 so as to partake in its reciprocation; they are adapted to engage the perforations 39 of the web 21.

In Fig. 5 the grippers 28 are shown in position for engaging the web. When moving to the right, they engage the perforations 39 (Fig. 6) and pull the web past the cutter 40. A spring 24 secured to the upper lath 23 exerts a slight pressure on the advancing web in order to keep it properly stretched. If it is desired to interrupt the feed, the shaft 26 is turned by depressing a lever 27 as shown in Fig. 4, thereby causing the laths 23 to be raised so that the web is moved out of reach of the grippers 28.

When the chain 29 has completed its stroke to the right, the cutter 40 descends and severs a blank 1 from the web 21 along the rear line 22 in Fig. 10. The cutter 40 is actuated by a cam 45 keyed onto a shaft 44, (Fig. 7) which also serves for operating the presser foot and the adhesive applying device 12, 47. A roller 40' is secured to the shaft of the cutter 40 and a spring 40'' tends to hold the roller 40' engaged with the cam 45. The blank is now in the position shown in Fig. 1 and a letter or other enclosure 25 is placed on the superstructure 4 either by hand or by automatic means of the type used in connection with printing presses. The folder 7 now descends and the blank with the envelope is fed onto the table 13 as described.

The presser foot 12 which may be formed by an angular or U-shaped strip of rubber or the like, is mounted in a frame 48 to which is secured a pair of vertical rods 46', which are reciprocated from the shaft 44 by a system of links and levers not shown in detail. When the blank is in position on the table 13, the frame 48 descends and the presser foot 12 is lowered to the blank. An adhesive applying strip 47 of L or U-shape, according to which areas shall be provided with adhesive, is secured to another pair of vertical rods 46 which is also reciprocated from the shaft 44; this strip being so designed as to be free to move a certain distance independently from the holding strip 12. When the frame 48 of the holder 12 has been lowered, a roller 51 which is normally immersed in an adhesive tank 50, is advanced by automatic means (not shown) which actuate pairs of links 52 and 52', the roller being supported in eyes at the ends of the links. Guide rollers 55 secured to the links cooperate with tracks 53 in such manner that the roller 51 moves along the underside of strip 47 and applies adhesive thereto. A spring 54 acting on the joint of the links holds the rollers 55 in engagement with the tracks 53.

When the strip 47 has been coated with adhesive, it descends onto the blank under the action of rods 46 and applies adhesive to the portions 76, 77 and also 78, if desired. The strip 47 and the presser foot 12 are then lifted off the blank. The folder 14 now descends, folds the blank along the line 56 and delivers it to the pair of cylinders 16, the width of which is such that they do not exert pressure on the portions of the envelope to which adhesive has been applied.

Resilient fingers 60 secured to the folder 14 prevent backward motion of the parts of a blank during the final folding operation.

The cylinders 16 allow the envelope to drop onto the bars 20 between the plates 65 of the sealing press which has been opened by eccentrics 62 acting on levers 63 which are fulcrumed at 63' at one end and linked to the plates 18 of the press at 63''. Rotation is imparted to the eccentrics 62 by any suitable means (not shown). The sealing plates 65 are secured to the ends of springs 64 which are mounted on the jaws 18 of the press. Heating means, preferably electric resistance wires 61, are provided in recesses of the plates 18. When the plates 18 are moved inwards by the eccentrics 62, the sealing plates 65 exert a steadily increasing pressure on the envelope and, at the same time, heat and dry the adhesive. When the sealing operation is finished, the plates 18 and 65 and the bars 20 are withdrawn and the envelopes are allowed to drop onto the chute 19 which leads them to the point of delivery.

Automatic means may be provided for regulating the unwinding of the web from the reel 66 in conformity with the cutting of the blanks. The web runs over a roller 21' which is so arranged as to form a loop which is engaged by a weighted finger 67 resting on the web and which is free to rotate about a pin 68. A pin 69 secured to the member holding the finger cooperates with a lever 70 fulcrumed at 70', the other end of the lever being connected with the sleeve 70'' of a clutch member 72 mounted on a constantly rotating shaft 71. The clutch member 72 is adapted to engage a complementary clutch member 73 on the shaft 66' of the supply roller 66. When the web is fed into the device, the length of the loop is reduced and the finger 67 is raised, causing lever 70 to be rocked anti-clockwise and to throw in the clutch 72, 73 so that the shaft 66' is rotated and the web is unwound from the reel until the finger 67 has returned to its normal position in which the clutch 72, 73 is thrown out.

As illustrated in Fig. 9, the device may also be provided with means for printing and addressing the envelopes. 77 is the platen and 78 is the pad of a printing or embossing machine 75 of some suitable kind actuated by an eccentric 76. The web 21 passes through between the platen 77 and the pad 78. 79 is the platen and 80 is the pad of an addressing machine. The web is thus printed and addressed before the blanks are cut off. Obviously the addressing machine may be arranged in advance of the printing machine and is preferably arranged to be thrown out independently, so that the finished envelopes will bear the addresses printed thereon, as desired. If desired, the plates 65 of the sealing press may be constructed to form embossing platens.

I wish it to be understood that I do not desire to be limited to the exact details of construction shown and described, for obvious modifications will occur to a person skilled in the art.

Claims:

1. Envelope folding device comprising means for cutting envelope blanks from a continuous paper web and means for simultaneously folding a blank and an enclosure and for thereafter sealing said blank.

2. Envelope folding device comprising a cutter, means for feeding a continuous web of paper towards said cutter and means for simultaneously folding a blank severed from said web and an enclosure and for thereafter sealing said blank.

3. Envelope folding device comprising a cutter, reciprocating grippers for feeding a continuous web of paper towards said cutter and means for simultaneously folding a blank severed from said web and an enclosure and for thereafter sealing said blank.

4. Envelope folding device comprising a cutter, means adapted to enter perforations of a continuous paper web and to thereby feed said web towards said cutter and means for simultaneously folding a blank severed from said web and an enclosure and for thereafter sealing said blank.

5. Envelope folding device comprising a cutter, hook-shaped reciprocatory grippers adapted to enter perforations of a continuous paper web so as to feed said web towards said cutter, but to release said web on their return stroke, and means for simultaneously folding a blank severed from said web and an enclosure and for thereafter sealing said blank.

6. Envelope folding device comprising a cutter, means for feeding a continuous web of paper towards said cutter, means for simultaneously folding each blank severed from said web and an enclosure and for thereafter sealing said blank, and means for operating said cutter in dependency upon the movement of said feeding means.

7. Envelope folding device comprising a cutter, hook-shaped reciprocatory grippers adapted to enter perforations of a continuous paper web so as to feed said web towards said cutter, but to release said web on their return stroke, means for moving said web out of reach of said grippers and means for simultaneously folding a blank severed from said web and an enclosure and for thereafter sealing said blank.

8. Envelope folding device comprising means for cutting envelope blanks from a continuous paper web, means for simultaneously folding a blank and an enclosure, and mechanical means influenced by said web for automatically regulating the unwinding of said web.

9. Envelope folding device comprising means for cutting envelope blanks from a continuous paper web, means for simultaneously folding a blank and an envelope and for thereafter sealing said blank and mechanical means influenced by said web and comprising a lever and a clutch operatively connected with said clutch for regulating the unwinding of said web.

10. Envelope folding and sealing device comprising means for cutting envelope blanks from a continuous paper web, a pair of superposed tables, one for a blank and another one for an enclosure and means for simultaneously folding said blank and enclosure and for thereafter sealing said blank.

11. Envelope folding and sealing device comprising means for cutting envelope blanks from a continuous paper web, a pair of superposed tables, one for a blank and another one for an enclosure, means for simultaneously folding a blank and an enclosure and a pair of feed cylinders below the lowermost table.

12. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, means below said pair of cylinders for once more folding said blanks and another pair of feed cylinders below these latter folding means.

13. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, an adhesive applying device below said cylinders, means below said adhesive applying device for once more folding said blanks and another pair of feed cylinders below these latter folding means.

14. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, an adhesive applying device below said cylinders, means below said adhesive applying device for once more folding said blanks and a pressing device below said latter folding means.

15. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, an adhesive applying device below said cylinders, means below said adhesive applying device for once more folding said blanks, a pressing device below said latter folding means and electric means for heating said pressing device.

16. Envelope folding and sealing device comprising means for cutting envelope blanks from a continuous paper web, a pair of superposed tables, one for a blank and another one for an enclosure, means for folding said blanks and enclosures together, a pair of feed cylinders below the lowermost table, means below said pair of cylinders for adjusting said blanks, means for once more folding said blanks and another pair of feed cylinders below these latter folding means.

17. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, an adhesive applying device below said cylinders, comprising an elastic stamp, a roller adapted to roll in contact with the bottom edge of said strip, and rails for guiding said roller, means below said adhesive applying device for once more folding said blanks and another pair of feed cylinders below these latter folding means.

18. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, an adhesive applying device below said cylinders, means below said adhesive applying device for once more folding said blanks and another pair of feed cylinders below these latter folding means, these cylinders being inferior in width to the cylinders of the first pair.

19. Envelope folding and sealing device comprising means for cutting envelope blanks from a continuous paper web, a pair of superposed tables, one for the blanks and another one for the enclosures, means for folding said blanks and enclosures together, a pair of feed cylinders below the lowermost table, an adhesive applying device below said cylinders, means below said adhesive applying device for once more folding said blanks and a pressing device below said latter folding means, comprising a pair of reciprocatory jaws and a pair of smaller plates associated with and preceding said jaws.

In testimony whereof I affix my signature.

OTTO WIDMAIER.